United States Patent [19]
Fein et al.

[11] 3,985,540
[45] Oct. 12, 1976

[54] METAL COMPLEXES OF HYDROXYQUINOLINE AND POLYMERIC POROUS GRANULES

[75] Inventors: Marvin M. Fein, Westfield, N.J.; Nathan D. Field, Allentown; Earl P. Williams, Pen Argyl, both of Pa.

[73] Assignee: GAF Corporation, New York, N.Y.

[22] Filed: Apr. 2, 1970

[21] Appl. No.: 25,290

[52] U.S. Cl. .................................. 71/67; 71/85; 71/94; 71/DIG. 1; 260/2.5 N; 260/29.2 N; 260/78 SC; 260/80; 424/78; 424/258; 526/23; 526/303
[51] Int. Cl.² ........................................ A01N 5/00
[58] Field of Search ......... 71/94, 66, 67, 77, DIG. 1

[56] References Cited
UNITED STATES PATENTS

| | | | |
|---|---|---|---|
| 3,167,473 | 1/1965 | Seebrick | 71/67 |
| 3,316,173 | 4/1967 | Mills et al. | 71/67 |
| 3,328,256 | 6/1967 | Gaunt | 71/DIG. 1 |
| 3,451,801 | 6/1969 | Teumac | 71/67 X |

OTHER PUBLICATIONS

Alabaster, Proceedings 4th British Weed Control Conference, June 1958, pp. 84 & 85.

*Primary Examiner*—Glennon H. Hollrah
*Attorney, Agent, or Firm*—Walter C. Kehm; Marilyn J. Maue

[57] ABSTRACT

Metal complexes of 8-hydroxyquinoline and polymeric water-insoluble but water-swellable cross-linked N-vinyllactam or N-alkyl-N-vinylamide polymers in the form of porous beads or granules and a process for preparing same. Such complexes are particularly suited for use as algicides, fungicides, slimicides, and bacteriocides in the treatment of water such as in gravity filtration systems, canisters or packed columns having the advantage of rapid throughput. The complexes may be prepared by adsorbing the hydroxyquinoline onto the cross-linked N-vinyllactam or N-alkyl-N-vinylamide in the form of porous beads or porous granules and subsequently forming the metallic complex in solution.

12 Claims, No Drawings

METAL COMPLEXES OF HYDROXYQUINOLINE AND POLYMERIC POROUS GRANULES

The instant invention is directed to metal complexes of hydroxyquinoline and polymeric porous granules. In particular, the instant invention is directed to metal complexes of 8-hydroxyquinoline and a water-insoluble but water-swellable cross-linked N-vinyllactam or N-alkyl-N-vinylamide polymer, in the form of porous beads or porous granules. Furthermore, the instant invention is directed to a process for preparing such complexes.

For many years water-insoluble powders of polyvinyl pyrrolidone, similar lactams, and similar vinylamides were utilized for a variety of purposes including among others as filtering media in packed column and similar filtration purification systems. The powdered materials, however, are unsatisfactory in most instances because of the extremely long drainage time of liquid through the powder. Accordingly, it has long been the desire to provide an improved product which will eliminate such deficiency.

Co-pending applications Ser. No. 736,302, filed June 12, 1968 now abandoned, Ser. No. 875,516 filed Nov. 10, 1969 now abandoned, describe such an improved product, the product being a crosslinked vinylpyrrolidone or similar polymer in the form of highly porous beads which are water-insoluble but water swellable. As disclosed in such co-pending application, such novel crosslinked polymers have the advantage of good strength and rapid throughput in gravity or pressure filtration systems or packed column filtration operations.

In accordance with the instant invention, it has been found that extremely useful products may be prepared by complexing a metal with a complex of 8-hydroxyquinoline and a water-insoluble but water-swellable cross-linked N-vinyllactam or N-alkyl-N-vinylamide polymer in the form of porous beads or porous granules. It is to be noted that the product of the present invention is particularly well suited for use in cartridges, canisters, or column filtration purification systems wherein the property of rapid throughput is desired. For example, the novel complex of the instant invention is particularly well suited for use as an algicide in swimming pool filtration systems. It is further noted that the resulting complex granules have fungicidal activity and are therefore useful on greenhouse soils and plant beds.

Still further, it is noted that the resulting products of the instant invention, due to their bulk, are less dangerous in applications wherein dusts have previously been employed and that said granules and complexes which result herein are particularly useful in addition as fungicides, slimicides, and bactericides.

Accordingly, it is an object of the instant invention to provide a novel product which is particularly suited for use in the clarification and/or purification of water.

A further object of the instant invention is to provide a product which has algicidal, fungicidal, and bactericidal activity.

A still further object of the instant invention is to provide a novel metallic complex of 8-hydroxyquinoline and a water-insoluble but water-swellable cross-linked N-vinyllactam or N-alkyl-N-vinylamide polymer in the form of porous beads or porous granules.

A further object of the instant invention is to provide a process for preparing a novel metallic complex of 8-hydroxyquinoline and a water-insoluble but water-swellable cross-linked N-vinyllactam or N-alkyl-N-vinyl amide polymer in the form of porous beads or porous granules.

A still further object of the instant invention is to provide a novel metallic complex of 8-hydroxyquinoline in the form of porous beads or porous granules, which complexes are particularly suited for use as complexing agents in water purification systems.

Still further objects of the instant invention will become more apparent from the following more detailed description thereof.

As previously noted, the instant invention is directed to metallic complexes of 8-hydroxyquinoline and a water-insoluble but water-swellable cross-linked N-vinyllactam or N-alkyl-N-vinylamide polymer in the form of porous beads or porous granules.

The N-vinyllactams employed in the preparation of the cross-linked polymers of the complexes of the present invention are lactams corresponding to the general formula:

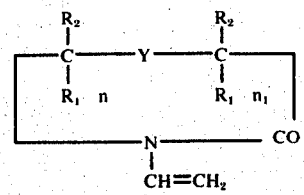

where $R_1$, and $R_2$ = hydrogen, alkyl and aryl

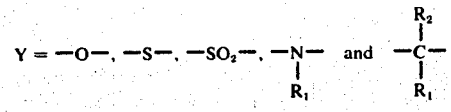

$n$ and $n_1$ range from 0 to 5, but where only one of the $n$ or $n_1$ values may be zero.

Such N-vinyllactams are those which can be prepared, for example, by the vinylation of lactams such as disclosed in U.S. Pat. No. 2,891,058; 2,265,450; 2,335,454; and 3,097,087. Similarly, the N-vinyllactams may be prepared in a known manner by N-vinylation of the corresponding lactams at elevated temperatures in a manner such as disclosed in U.S. Pat. No. 2,317,084. Accordingly, representative N-vinyllactams operable in accordance with the present invention include such as: N-vinyl-2-pyrrolidinone and N-vinyl-substituted derivatives of the following lactams: 3,3-dimethyl-2-pyrrolidone, 4,4-dimethyl-2-pyrrolidone, 3,4-dimethyl-2-pyrrolidone, 3-ethyl-2-pyrrolidone, 3,5-dimethyl-2-pyrrolidone, 3-phenyl-2-pyrrolidone, 4-acryl-2-pyrrolidone, 5-ethyl-2-pyrrolidone, 3-methyl-2-pyrrolidone, 4-methyl-2-pyrrolidone, 5-methyl-2-pyrrolidone, 3,3,5-trimethyl-2-pyrrolidone; 2-piperidone, 5,5-diethyl-2-piperidone, 5,6-dimethyl-2-piperidone, 4-ethyl-2-piperidone, 6-ethyl-2-piperidone, 6-ethyl-3-methyl-2-piperidone, 3-methyl-2-piperidone, 4-methyl-2-piperidone, 5-methyl-2-piperidone, 6-methyl-2-piperidone; 2-caprolactam, 3,6-dimethyl-2-caprolactam, 4,6-dimethyl-2-caprolactam, 4,7-dimethyl-2-caprolactam, 7,7-diethyl-2-caprolactam, 3-ethyl-2-caprolactam, 5-ethyl-2-caprolactam, 6-ethyl-2-caprolactam, 7-ethyl-2-caprolactam, 4-ethyl-6-methyl- 2-caprolactam, 6-ethyl-4-methyl-2-caprolactam, 3-methyl-2-caprolactam, 4-methyl-2-caprolactam, 5-methyl-2-caprolactam, 6-methyl-2-caprolactam; 2-oxazinidinone (e.g., USP 2,905,669 and USP 3,097,087), 5-ethyl-2-oxazinidinone, 5-phenyl-2-oxazinidinone, 4,5-dimethyl-2-oxazinidinone, 5,5-dimethyl-2-oxazinidone, 2,5-diphenyl-2-oxazinidinone, 2-phenyl-4-oxothiazolidone, 2,2'-diphenyl-4-oxothiazolidone, 2,2'-dimethyl-4-oxothiazolidone; 2-oxazolidinone (deriv. in USP 2,905,690 and USP 2,891,058), 5-methyl-2-oxazolidinone, 4-methyl-2-oxazolidinone, 5-ethyl-2-oxazolidinone, 4,5-dimethyl-2-oxazolidinone, 2-phenyl-2-oxazolidinone, 5-butyl-2-oxazolidinone, 5-propyl-2-oxazolidinone, 4,5-diethyl-2-oxazolidinone; 3-morpholinone disclosed in USP 2,987,509, e.g., 5-methyl-3-morpholinone, 5-ethyl-3-morpholinone; 3,5-dimethyl-3-morpholinone; 2-piperazinone (e.g., JACS 62, 1202 1940), the 3,3-dimethyl-2-ketopiperazine, 3-methyl-2-ketopiperazine; 4-thiazolidone (e.g., JACS 76, 578 (1954), 2-methyl-4-thiazolidinone; 2-phenyl-4-thiazolidinone; 2-phenyl-4-thiazolidinone dioxide; 2-thiazolidone (J. Chem. Soc. 1949, 2367); 3-thiamorpholinone; 2-pyrimidone (e.g., J. Chem. Soc. 1959, 525); 2-imidazolidones (e.g., Ann. 232, 1222 (1885); N,N-ethylenethioureas (e.g., J. Biol. Chem. 163, 761 (1946); tetrahydro-(2H, 1, 3)-oxazin-3-ones (e.g., USP 2,940,971), and the like.

Similarly, suitable N-alkyl-N-vinylamides useful in accordance with the present invention are those which correspond to the formula:

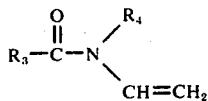

wherein $R_3$ and $R_4$ are independently selected from the class of hydrocarbon radicals of 1 to 4 carbon atoms, preferably 1 to 2 carbon atoms.

Such N-alkyl-N-vinylamides are illustrated in U.S. Pat. No. 3,214,370, exemplary amides being: N-methyl-N-vinylacetamide, N-ethyl-N-vinylacetamide, N-butyl-N-vinylacetamide N-methyl-N-vinylpropionamide, N-methyl-N-vinylpentanic acid amide, N-methyl-N-vinylformamide, and the like.

In preparing the porous granular or porous bead form of polymer in accordance with the present invention, the N-vinyllactam or N-alkyl-N-vinylamide, with or without a further copolymerizable monomer and with a cross-linking agent as to be hereinafter defined, is polymerized in a manner described in co-pending applications Ser. No. 736,302 and 875,516. In this connection, as defined in such co-pending application, the porous granular or bead form of the polymer is produced from a suspension polymerization system wherein the lactam or amide monomer with optional copolymerizable monomer and cross-linking agent is polymerized in an aqueous solution of an electrolyte, the suspension being maintained during polymerization by mechanical means. In such polymerization process a free radical polymerization source is utilized.

In this regard, the preparation of the porous bead or granular form of polymer involved the polymerization of the N-vinyllactam or N-alkyl-N-vinylamide with an amount of crosslinking agent, i.e., divinyl monomer within the range of about 0.1% to about 20% by weight based on the weight of the N-vinyllactam or N-alkyl-N-vinylamide. Such polymerization is carried out in an aqueous solution of an electrolyte, the concentration of electrolyte being high enough to produce phase separation before or during polymerization. In this regard, a preferred electrolyte solution contains from about 10% to about 20% sodium sulfate. Since the monomers polymerized in accordance with this procedure are not very soluble in such electrolyte solutions, by using more than enough monomers to saturate the solution of electrolyte a suspension of the excess monomers can be made through mechanical agitation. In this connection, the use of excess undissolved salt is often beneficial since the solid becomes enmeshed in the bead or granule and upon dissolution increases the surface area of the porous product.

In the polymerization process, the relative proportion of total monomer to water is determined at the upper limit by the ability of heat removal and the danger of particle agglomeration, this upper limit being as high as about 80% monomer, preferably about 50% monomer based upon the weight of the water. The lower limit is inter alia based on convenience of operating without undue bulk, the process of the present invention being capable of being carried out successfully with as low as 1% monomer, preferably 10% monomer based on the weight of the water in the aqueous electrolyte system.

As indicated previously, the polymerization process is conducted in the presence of a catalyst which provides a source of free radicals. In this respect, any of the conventional free radical initiator catalysts generally employed in vinyl polymerizations can be employed in accordance with the process of the present invention, such catalysts being added either to the mixture of monomers polymerized in accordance with the present invention or to the aqueous solution of electrolyte. Thus, for example, the catalyst can comprise any of the conventional peroxide catalysts, e.g., benzoyl peroxide, di-t-butyl peroxide, as well as the preferred azo catalysts, e.g., azobisisobutyronitrile.

The cross-linking agents which are suitably employed in the preparation of the porous bead or granular form of polymer in accordance with the present invention are those which contain two or more functional groups capable of taking part in the polymerization reaction so as to provide a polymeric product having a cross-linked or three-dimensional structure.

Accordingly, suitable cross-linking agents that have been found particularly applicable in accordance with the present invention are the alkylenebisacrylamides, e.g., N,N'-methylenebisacrylamide, the alkylene glycol dimethacrylates, e.g., ethylene glycol dimethacrylate, diethylene glycol dimethacrylate, tetraethylene glycol dimethacrylate, higher polyethylene glycol dimethacrylate, 1,3- and 1,4-butanediol diacrylates and dimethacrylates, etc., and the divinyl aromatic compounds, e.g., divinyl benzene, divinylethylbenzene, divinylchlorobenzene, divinyltoluene, divinyl naphthalene, etc. Other suitable cross-linking agents include allyl acrylate, p-isopropenylstyrene, trivinyl meseate, diallyl maleate, divinyl ether, 1,3- or 1,4-divinyl oxybutane, trivinyl citrate, divinyl o-phenylene diacetate, vinyl allyl ether, diethylene glycol diallyl ether, trivinyl glyceryl ether, divinyl glyceryl ether, tetravinyl pentaerythrityl ether, hexahydro-1,3,5-triacryl-s-triazine, vinylpyrrolidone dimers described in U.S. Pat. No. 3,252,995, and the like. Of course, mixtures of the abovecited suitable cross-linking agents can be advantageously employed where desired.

As indicated above, the cross-linking agent is generally employed in an amount of from about 0.1% to about 20% by weight based upon the weight of the N-vinyl lactam or N-alkyl-N-vinylamide monomer. An amount of from about 3% to about 5% of the cross-linking agent is preferred.

Similarly, as indicated above, the N-vinyllactam or N-alkyl-N-vinylamide can be polymerized in the presence of an optional copolymerizable monomer. Preferably such copolymerizable monomer should be present in an amount of less than about 50% by weight based on the weight of the N-vinyllactam or N-alkyl-N-vinylamide monomer, and more preferably, in an amount of less than about 20% by weight.

Examples of comonomers which can be employed are the N-vinyllactams or N-alkyl-N-vinylamides listed above, or acrylates, e.g., methyl, ethyl, propyl and higher alkyl, phenyl, naphthyl and other aryls; α-substituted acrylates such as α-methyl, ethyl, propyl and higher alkyl, phenyl, naphthyl and other aryls; vinyl ethers, e.g., methyl, ethyl, propyl and higher alkyls, acrylamide, acrylic acid, acrylonitrile, allyl acetate, allyl alcohol, crotonic acid, dimethylaminoethylvinyl sulfide, diethylhexyl maleate, didodecyl maleate, fumaramide, itaconic acid, methacrylic acid, methacrylamide, methoxy styrene, methyl vinyl ketone, methyl vinylpyrrolidone, 2-methyl-5-vinyl pyridine, styrene, trichloroethylene, vinyl carbazole, vinylimidazole, vinyl laurate, vinyl methyl benzimidazole, vinyl methyl dichloro silane, vinyl methyl oxazolidinone, vinyl oxyethylurea, vinyl propionate, vinyl pyridine, vinyl siloxanes, vinyl stearate, vinyl acetate (and the derived vinyl alcohol).

It is noted that a further description of the production of the cross-linked particulate polymeric N-vinyllactam polymers and copolymers and N-alkyl-N-vinylamide polymers and copolymers in the form of porous beads or granules can be found in co-pending applications Ser. No. 736,302 and 875,516. Thus, for example, the polymerization process may be carried out by adding all of the monomers to the salt solution in one charge or such monomers may be added in portions or continuously during the polymerization. The polymerization is usually carried out at about 50° to 80° C and requires a relatively short time for completion, e.g., about two to six hours. Accordingly, the disclosure of co-pending application Ser. No. 736,302 and 875,516 as it pertains to the production of the water-insoluble but water-swellable cross-linked polymers employed in the process of the present invention is herein incorporated by reference.

According to the process of the instant invention, 8-hydroxyquinoline is adsorbed onto the above-discussed cross-linked N-vinyllactam or N-alkylvinylamide porous granules or porous beads. Subsequent thereto, the 8-hydroxyquinoline-cross-linked N-vinyllactam or N-alkyl-N-vinylamide is complexed with a metallic salt in solution.

The 8-hydroxyquinoline may be adsorbed onto the above-noted polymer porous granules or porous beads, either by adding wet or dry beads to said 8-hydroxyquinoline. The porous beads may be pre-soaked either with water or alcoholic solutions and subsequently filtered prior to addition to said 8-hydroxyquinoline; or, in the alternative, may be added thereto in the dry state. Subsequent to the addition of such porous granules or porous beads to said 8-hydroxyquinoline, the resultant slurry is then mixed for a period of time ranging from about 5 to about 25 hours, filtered and dried in the air. The concentrations employed in the above reaction may of course be varied, depending upon the amount of said 8-hydroxyquinoline to be adsorbed on said beads. Furthermore, the amount of solvent and the length of reaction time may also be varied, depending upon economic and other considerations. It is to be noted, however, that preferably from about 5 to about 60% of said 8-hydroxyquinoline is adsorbed onto said porous granules or porous beads.

Subsequent to the absorption of said 8-hydroxyquinoline onto the cross-linked N-vinyllactam or N-alkyl-vinylamide polymers, said porous beads are then added to an aqueous solution of a metallic salt. Exemplary of such metallic salts are the sulfates of copper, zinc, manganese, iron, aluminum, and the like. It is to be noted, however, that it is not necessary to employ the sulfate salt in that other sales are equivalent thereto.

It is further noted that preferably the metal complex is a copper II complex of said 8-hydroxyquinoline-cross-linked-N-vinyllactam or N-alkyl-vinylamide polymer in the form of porous beads and porous granules.

The instant invention will now be illustrated by the following more detailed examples thereof. It is to be noted, however, that the instant invention is not deemed as being limited thereto.

EXAMPLE 1

Into a 2-gallon, stainless steel stirred autoclave the following ingredients were charged:

3.3 g. azobisisobutyronitrile previously dissolved in 660 g. of vinyl pyrrolidone; 33 g. Dow divinylbenzene mixture (50-60; Assay 55%); 2150 g. distilled water; 10 g. 10% by weight dibasic sodium phosphate buffer solution; 570 g. anhydrous sodium sulfate (Baker's Reagent Grade).

The autoclave was then purged of air by applying a vacuum to 25 mm. The vacuum was then released with nitrogen and the procedure repeated two more times. The materials were then heated with stirring (210 RPM, 4 blade turbine) to 65° C over a period of one hour and held at said temperature for a period of three hours at a pressure of 3 to 4 Psig. A side flange was removed from the autoclave, and a dispersion of 1.5 g. azobisisobutyronitrile in 50 mls. of C.P. ehtanol were added through the port. The flange was then replaced and the reaction continued for an additional hour at 65° C. The temperature was then raised to 85° C. over a period of one-half hour and then held at that temperature for an additional two-hour period (8 to 10 Psig). The reaction product was then cooled and discharged into a Buchner funnel and washed with distilled water to remove any remaining sodium sulfate until a portion of the filtrate was tested with a few millimeters of saturated barium chloride solution and was found to be less turbid than a barium chloride control test with tap water. After allowing the excess water to drain, the wet porous beads weighed 3125 grams. A 100 gram portion of these porous beads were then dried in a high-vacuum oven at a temperature of between 65° and 70° C., and the dried porous beads again weighed, so as to determine a 95.1% yield.

EXAMPLE 2

Into a 500 ml. resin flask equipped with thermometer, stirrer, gas inlet, dropping funnel, and condenser connected to gas outlet were charged:

40.0 g. (0.36 mole) distilled vinylpyrrolidone; 0.12 g. azobisisobutyronitrile; 240.0 g. distilled water; 1.6 g (0.010 mole) methylenebisacrylamide; 0.46 g. 10% weight solution $Na_2HPO_4$; 40.0 g. anhydrous sodium sulfate.

Air was removed by closing the gas inlet and applying enough vacuum at the gas outlet to cause violent ebullition for 30 seconds. The vacuum was then released by allowing nitrogen to enter the gas inlet. This procedure was repeated two more times and then a positive pressure of nitrogen maintained by connecting the gas outlet to a mineral oil blow-out leg having a depth of one inch of oil. The flask was heated with stirring in a constant temperature bath for 4 hours at a reaction temperature of 50° to 65° C. At the end of this time a solution of: 0.04 g. azobisisobutyronitrile; 0.4 g. methylenebisacrylamide; 10.0 g. C.P. ethanol; and 10.0 g. distilled water was charged to the dropping funnel and the air removed by violent ebullition and replaced with nitrogen. This procedure was repeated two more times by suitable adapters connected to the dropping funnel.

The above solution was then added to the contents of the flask and the heating continued for 2 additional hours at 62° to 65° C. At the end of this time the porous beads produced were filtered and washed with one gallon of distilled water and then dried in a vacuum oven at 40° C.

The dried white porous beads weighing 41.5 grams (98.8% yield) were substantially ash-free, whiteness being due to the light scattering caused by the pores within the beads. The porosity was confirmed by microscope examination.

EXAMPLE 3

Following the procedure of Example 2, 40.0 g. (0.36 mole) distilled vinylpyrrolidone, 0.4 g. azobisisobutyronitrile, 200.0 g. distilled water, 1.2 g. ethylene glycol dimethacrylate, 0.5 g. 10% by weight $Na_2HPO_4$, 33.0 g. anhydrous sodium sulfate were charged to the resin flask and heated with stirring at a reaction temperature of 50° to 69° C. for a total of 5½ hours.

The beads were filtered and washed with one gallon distilled water and dried in a vacuum oven at 45° to 50° C.

The dried white porous beads weighed 39.0 grams (94.6% yield).

EXAMPLE 4

Following the procedure of Example 2, 40.0 g (0.36 mole) distilled vinylpyrrolidone, 0.12 g. azobisisobutyronitrile, 240.0 g. distilled water, 2.0 g. tetraethylene glycol dimethacrylate, 1.0 g. 10% by weight $Na_2HPO_4$ solution, 40.0 g. anhydrous sodium sulfate were charged to the resin flask and heated with stirring at a reaction temperature of 50° to 67° C. for a total of 5 hours. The washed and dried porous beads weighed 39.2 grams (93.3% yield).

EXAMPLE 5

Following the procedure of Example 2, 40.0 g. distilled vinylpyrrolidone, 0.12 g. azobisisobutyronitrile, 240.0 g. distilled water, 6.0 g. polyethylene glycol dimethacrylate, 2.0 g. 10% by weight solution $Na_2HPO_4$, 40.0 g. anhydrous sodium sulfate were charged to the resin flask and heated with stirring at a reaction temperature of 50° to 68° C. for a period of 5¾ hours. The washed and dried porous beads weighed 40.0 g. (86.9% yield).

EXAMPLE 6

Following the procedure of Example 2, 40.0 g. distilled vinylpyrrolidone, 0.16 g. azobisisobutyronitrile, 132.0 g. distilled water, 1.6 g. p-divinylbenzene (99% purity of Shell Oil Co.), 0.14 g. 10% by weight $Na_2HPO_4$, 35.0 g. anhydrous sodium sulfate were charged to the resin flask and heated with stirring at a reaction temperature of 50° to 84° C. for a period of 4.0 hours.

50 ml. methanol were added and stirred for ½ hours at 75° C., then filtered and washed as before. The dried porous beads weighed 41.6 grams (100% yield).

EXAMPLE 7

Production of Copolymer of 60 parts vinylpyrrolidone 40 parts acrylamide cross-linked with divinylbenzene.

The following reactants were charged into a one liter stainless steel autoclave equipped with a 4 blade turbine-type stirrer:

96.0 g. vinylpyrrolidone, 8.0 g. divinylbenzene Dow DVB-55 (a mixture of isomers of divinylbenzene, ethyl vinylbenzene, and diethylbenzene, the total divinylbenzene content being 55.0%), 520.0 g. distilled water, 2.8 g. 10% by weight $NA_2HPO_4$ solution, 0.64 g. azobisisobutyronitrile, 140.0 g. anhydrous sodium sulfate, 64.0 g. acrylamide. The autoclave was evacuated to 25mm and the vacuum released with nitrogen. This procedure was repeated two more times. The contents of the autoclave were then heated with stirring to 90° C. and held at that temperature for three hours. The beads were discharged, washed free of sodium sulfate, and dried. The product yield was 151 grams (or 90% yield).

EXAMPLE 8

99 parts vinylpyrrolidone, one part acrylamide cross-linked with divinylbenzene.

The following reactants were charged with a one-liter stainless steel autoclave and treated in a manner similar to Example 9:

118.8 g. vinylpyrrolidone, 1.2 g. acrylamide, 390.0 g. distilled water, 0.5 g. azobisisobutyronitrile, 6.0 g. Dow DVB-55 divinylbenzene, 105.0 g. anhydrous sodium sulfate, 0.4 g. 10% by weight $Na_2HPO_4$ solution.

The copolymer was produced in a yield of 94.7%.

EXAMPLE 9

600 grams of the product of Example 1 were soaked in 600 ml. of technical ethanol for one hour, then filtered. This procedure was repeated two more times in order to replace the water present in the granules with ethanol. The filtered beads were then added to a solution of 200 g. of 8-hydroxyquinoline (Baker's Reagent Grade) in 1400 ml. of technical ethanol. The slurry was then mixed for 19 hours, filtered and dried in air, with the resultant beads weighing 201.1 g. Two grams of dried beads were mixed for 19 hours in 100 mls. of 0.09N sulfuric acid. A 20 ml. aliquot of this solution was removed and titrated with 0.09N sodium hydroxide so as to determine that the beads contained 39.5% 8-hydroxyquinoline.

EXAMPLE 10

40 grams of copper sulfate $0.5H_2O$ were dissolved in 160 g. of distilled water and 20 g. of the beads of Example 9 were added thereto. The resulting slurry was then mixed for approximately 19 hours, and the porous beads were filtered and loose fines removed by washing. After allowing the beads to drain free of excess water, the wet green-colored porous beads weighed 56.7 g. A 10-gram portion dried to 4.2 grams.

EXAMPLE 11

11.4 grams zinc sulfate 0.7H$_2$O were dissolved in 38.6 g. of distilled water and 5 g. of the beads prepared in Example 9 were added thereto and mixed for 19 hours. The porous beads were filtered and washed free of loose fines, and yellow beads were obtained.

EXAMPLE 12

10.0 grams of manganous chloride 0.4H$_2$O were dissolved in 40 g. of distilled water, and 5 g. of dried beads as prepared in Example 9 were added thereto and mixed for 19 hours. The beads were filtered and washed free of fines. Yellow beads were obtained.

EXAMPLE 13

10.0 grams of ferric chloride 0.6H$_2$O were dissolved in 40 g. of distilled water, and 5 g. of dry beads as prepared in Example 9 were added thereto and mixed for 19 hours. The resulting blue porous beads were filtered and washed.

EXAMPLE 14

27.2 grams of wet beads (42% solids) as prepared in Example 10 were charged into a small glass column and 18.5 liters of distilled water passed through at a rate of 10 milliters per minute in order to leach out any copper sulfate remaining. Copper sulfate was detected in the first 300 milliliters collected; however, none was detected after 5.5 liters had passed therethrough.

3.5 liters of water from a green algae infested pond, filtered to remove insoluble materials, having a pH of 9.0 was then passed through the beads in the column at a rate of 10 milliliters per minute and collected in 500 milliliter fractions. These fractions were stored in capped bottles in sunlight with an untreated filtered control. The green algae formed in the control within one week, whereas no algae formed in any of the treated fractions in 35 days, duration of the test.

EXAMPLE 15

12.5 grams of aluminum sulfate 0.18H$_2$O were dissolved in 37.5 g. of distilled water and added to 3.2 g. of dry beads as prepared in Example 9 and mixed for about 19 hours. The yellowgreen beads which resulted were filtered and washed.

EXAMPLE 16

Example 1 was repeated except for the use of N-methyl-N-vinylacetamide instead of N-vinyl-2-pyrrolidone. The product was treated as in Example 9 and Example 10 to yield the corresponding beads containing 8-hydroxyquinoline, copper complex.

As will readily be apparent, the product of the instant invention is particularly well suited for the clarification of water in general and, in particular, swimming pool water. It is well known that many kinds of algaes may be controlled by copper sulfate, chlorine, and other algicides. However, for use in swimming pools, none of the above are completely satisfactory. For example, chlorine is commonly added as liquid chlorine, as a solution of sodium hypochlorite, or as a powder, calcium hypochlorite. As a result, many people object to the pool odor of chlorine, and some are physiologically hypersensitive thereto. In addition, slimy insoluble residues are deposited at the bottom of the pool, which raise further objection to the use thereof.

Use of the novel complexes of the instant invention, however, containing a metallic complex of 8-hydroxyquinoline in a cartridge of a filtration purification system provides answers to the above objections in connection with the purification of swimming pool water.

What is claimed is:

1. A complex formed by reacting 8-hydroxyquinoline and a water-insoluble but water swellable cross-linked polymer selected from the group consisting of N-vinyllactam or N-alkyl-N-vinylamide monomers, said polymer being in the form of porous beads or granules, to form a complex therebetween and thereafter reacting said complex with a metallic salt to form a complex between the metallic salt and said polymer complex.

2. The complex of claim 1 wherein said N-vinyl lactam monomer is selected from those having the formula

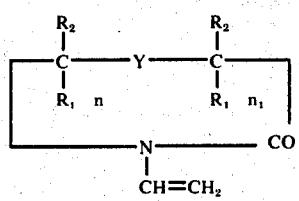

wherein $R_1$ and $R_2$ are selected from the group consisting of hydrogen, alkyl and aryl; Y is selected from the group consisting of

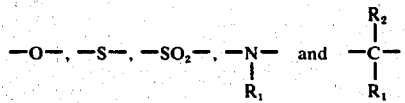

and $n$ and $n_1$ are integers from 0 to 5, with the proviso that only one of $n$ and $n_1$ may be zero.

3. The complex of claim 2 wherein said N-vinyllactam monomer is N-vinylpyrrolidone.

4. The complex of claim 1 wherein said N-alkyl-N-vinylamide monomer is selected from those having the formula:

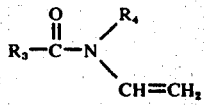

wherein $R_3$ and $R_4$ are hydrocarbon radicals of 1 to 4 carbon atoms.

5. The complex of claim 1 wherein said metal salt is a copper salt.

6. The complex of claim 1 wherein said metal salt is a salt of a metal selected from the group consisting of copper, zinc, manganese, iron, and aluminum.

7. A method of producing a complex of a metal salt, 8-hydroxyquinoline and polymeric porous beads or porous granules of a water-insoluble but water swellable cross-linked N-vinyllactam or N-alkyl-N-vinylamide which comprises reacting a water-insoluble but water swellable cross-linked polymer selected from the group consisting of N-vinyllactam or N-alkyl-N-vinylamide monomers, said polymer being in the form of porous beads or porous granules with 8-hydroxyquinoline to form a complex therebetween and thereafter reacting said complex with a metallic salt to form a complex between the metallic salt and said polymer complex.

8. The process of claim 7 wherein said polymer is in a wet form prior to contacting with 8-hydroxyquinoline.

9. The process of claim 7 wherein the polymer is in a dry form prior to contacting same with 8-hydroxyquinoline.

10. A complex according to claim 1 comprising N-vinyl-2-pyrrolidone, 8-hydroxyquinoline and a metal salt selected from the group consisting of copper sulfate, zinc sulfate, manganese chloride, iron chloride and aluminum sulfate.

11. A complex according to claim 1 comprising N-vinylacetamide, 8-hydroxyquinoline and a metal salt selected from the group consisting of copper sulfate, zinc sulfate, manganese chloride, iron chloride and aluminum sulfate.

12. A composition having algicidal, fungicidal and bactericidal activity comprising as active ingredient an effective amount of a complex according to claim 1.

* * * * *